(12) United States Patent
Ehrlich et al.

(10) Patent No.: US 9,117,278 B2
(45) Date of Patent: Aug. 25, 2015

(54) SYSTEM AND METHOD FOR GEOMETRIC MODELING USING MULTIPLE DATA ACQUISITION MEANS

(75) Inventors: Sharon Ehrlich, Kfar Vitkin (IL); Noam Meir, Herzlia (IL)

(73) Assignee: Dimensional Perception Technologies Ltd., Tirat Carmel (IL)

( * ) Notice: Subject to any disclaimer, the term of this patent is extended or adjusted under 35 U.S.C. 154(b) by 739 days.

(21) Appl. No.: 13/202,095

(22) PCT Filed: Feb. 18, 2010

(86) PCT No.: PCT/IB2010/050727
§ 371 (c)(1),
(2), (4) Date: Oct. 4, 2011

(87) PCT Pub. No.: WO2010/095107
PCT Pub. Date: Aug. 26, 2010

(65) Prior Publication Data
US 2012/0013710 A1    Jan. 19, 2012

Related U.S. Application Data

(60) Provisional application No. 61/153,657, filed on Feb. 19, 2009, provisional application No. 61/251,823, filed on Oct. 15, 2009.

(51) Int. Cl.
*H04N 13/02* (2006.01)
*G06T 7/00* (2006.01)
*G06T 17/20* (2006.01)

(52) U.S. Cl.
CPC ............... *G06T 7/0065* (2013.01); *G06T 17/20* (2013.01); *G06T 2207/10028* (2013.01)

(58) Field of Classification Search
None
See application file for complete search history.

(56) References Cited

U.S. PATENT DOCUMENTS 6,750,873 B1   6/2004   Bernardini et al.
2002/0158880 A1  10/2002   Williams et al.
(Continued)

FOREIGN PATENT DOCUMENTS

WO    WO 2010/095107    8/2010

OTHER PUBLICATIONS

International Search Report and the Written Opinion Dated Jul. 14, 2010 From the International Searching Authority Re. Application No. PCT/IB2010/050727.
(Continued)

*Primary Examiner* — Christopher S Kelley
*Assistant Examiner* — Kaitlin A Retallick

(57) ABSTRACT

A system and a method for modeling a predefined space including at least one three-dimensional physical surface, referred to hereinafter as a "measuring space". The system and method use a scanning system enabling to acquire three-dimensional (3D) data of the measuring space and at least one two-dimensional (2D) sensor enabling to acquire 2D data of the measuring space. The system and method may enable generating a combined compound reconstructed data (CRD), which is a 3D geometrical model of the measuring space, by combining the acquired 2D data with the acquired 3D data, by reconstructing additional 3D points, from the combined 3D and 2D data thereby generating the CRD model. The generated CRD model includes a point cloud including a substantially higher density of points than that of its corresponding acquired 3D data point cloud from which the CRD was generated.

26 Claims, 8 Drawing Sheets

(56) References Cited

U.S. PATENT DOCUMENTS

| | | |
|---|---|---|
| 2004/0179728 A1 | 9/2004 | Littlefield et al. |
| 2005/0033142 A1* | 2/2005 | Madden et al. ............... 600/407 |
| 2006/0140473 A1* | 6/2006 | Brooksby et al. ............. 382/154 |
| 2007/0031064 A1* | 2/2007 | Zhao et al. .................... 382/285 |

OTHER PUBLICATIONS

International Preliminary Report on Patentability Dated Sep. 1, 2011 From the International Bureau of WIPO Re. Application No. PCT/IB2010/050727.

* cited by examiner

SYSTEM AND METHOD FOR GEOMETRIC MODELING USING MULTIPLE DATA ACQUISITION MEANS

RELATED APPLICATIONS

This application is a National Phase of PCT Patent Application No. PCT/IB2010/050727 having International filing date of Feb. 18, 2010, which claims the benefit of priority of U.S. Provisional Patent Application Nos. 61/251,823 filed on Oct. 15, 2009 and 61/153,657 filed on Feb. 19, 2009. The contents of the above applications are all incorporated herein by reference.

BACKGROUND

1. Field of the Invention

The present invention relates generally to the field of geometric modeling and more particularly to geometric modeling using multiple data acquisition means.

2. Related Art

Creating a three-dimensional (3D) model of geometrical surfaces can be carried out by using 3D scanners, enabling to measure points over the surface, often called point cloud, each point in the cloud represented by three coordinates (x,y, z).

The density of the points in the point cloud usually depends on the scanner's resolution. A high resolution scanner can provide a dense cloud comprising high number of measured 3D points, producing a data file for each scanning session (e.g. represented via a three-dimensional matrix indicating each coordinate indicator of each measured point). The size of the file may be inefficient for various applications such as for online streaming of the measured data, real time analysis of the point cloud, etc.

High-resolution scanners can be quite expensive and may fail to provide additional information such as the coloring and texture of the surface. Moreover, these scanners may not be efficient for identifying objects and elements along the surface scanned and may be hard to handle in image analysis for identification of such objects due to their substantially homogenous scanning of the surface. These scanners usually do not enable changing the scanning resolution according to the amount of detailing (elements and objects) in each part of the surface scanned mainly since such information and distinction can only be executed once the scanning data is already provided.

BRIEF SUMMARY

Embodiments of the present invention provide a method comprising: acquiring 3D measurements of a specified space that contains physical objects, to yield at least one measured cloud of points, each point representing a specified location on a respective surface defining a respective object, wherein the measured cloud of points exhibits a first level of resolution; capturing at least one 2D image of the specified space, wherein the image comprises an array of pixels exhibiting a second level of resolution, wherein each pixel is associated with at least one physical parameter of a respective surface of a respective object; and applying a reconstruction function to the at least one 2D image and the at least one 3D measured cloud of points to yield a reconstructed cloud of points representing the surfaces of the objects, wherein the reconstructed cloud of points exhibits a third level of resolution, wherein the second level of resolution is significantly greater than the first level of resolution, the third level of resolution is greater than the first level of resolution; and wherein at least one of the acquiring, the capturing, and the applying is in operative association with at least one processor.

The present invention, in some embodiments thereof, provides a system and a method for modeling at least one part of a predefined space including at least one three-dimensional physical surface, where the space part is referred to as a "measuring space".

According to one aspect of the invention, there is provided a method that of modeling at least one measuring space including at least one three-dimensional (3D) physical surface, the method comprising: providing a scanning system enabling to acquire 3D data including a point cloud of the measuring space of substantially low-resolution; providing at least one two dimensional (2D) sensor enabling to acquire 2D data of the measuring space of substantially high-resolution; providing a positioning relation data, representing a positioning between the scanning system and the 2D sensor, which is known at any given moment while the scanning system and 2D sensor are operated; acquiring 3D data of the measuring space; acquiring 2D data of the measuring space; and generating a combined compound reconstructed data (CRD), which is a geometric model of the measuring space, by combining the acquired 2D data with the acquired 3D data, taking into account the positioning relation data, by reconstructing additional 3D points (e.g. using an interpolation), from the combined 3D and 2D data thereby generating the CRD model, where generated the CRD model includes a point cloud including a substantially higher density of points than that of the corresponding acquired 3D data point cloud.

According to another aspect of the invention, there is provided a method of modeling at least one measuring space including at least one three-dimensional (3D) physical surface, the method comprising: providing a scanning system enabling to acquire 3D data including a point cloud of the measuring space of substantially low-resolution; providing at least one two dimensional (2D) sensor enabling to acquire 2D data of the measuring space of substantially high-resolution; providing a positioning relation data, representing a positioning between the scanning system and the 2D sensor, which is known at any given moment while the scanning system and 2D sensor are operated; acquiring 3D data of the measuring space; acquiring 2D data of the measuring space, using the at least one 2D sensor; providing calibration data, which relates to the relation between the 2D imaging device and the 3D scanning system; generating a combined compound reconstructed data (CRD), by combining the acquired 2D data with the acquired 3D data in respect to the calibration data, by reconstructing additional 3D points creating a CRD model of the measuring space, from the combined 3D and 2D data; extracting elements data (ED) out of each 2D data acquired by the at least one 2D sensor; and generating a geometrical model of the measuring space and an element model of each extracted element, by combining the CRD of each part of the space with the extracted ED, where the generated CRD model includes a point cloud including a substantially higher density of points than that of the corresponding acquired 3D data point cloud.

According to yet another aspect of the invention, there is provided a system for modeling at least one measuring space including at least one three-dimensional (3D) physical surface, the system comprising: (i) an acquisition system comprising a scanning system comprising at least one scanner for acquiring 3D data of the measured space, wherein the acquired 3D data includes a point cloud; and at least one 2D sensor, operatively associated with said scanning system, wherein said 2D sensor enables acquiring 2D data of the scanned space part; and (ii) a geometrical modeling unit, which enables retrieving acquired 2D and 3D data and additional data from the acquisition system and analyze the received data to generate, a combined reconstructed data (CRD) model, which is a 3D geometrical model of the measuring space that was scanned, where the CRD is created by combining the acquired 2D data with the acquired 3D data, by reconstructing additional 3D points (e.g. using an interpolation) creating a CRD model of the measuring space, from the combined 3D and 2D data, and where the generated CRD model includes a point cloud including a substantially higher density of points than that of the corresponding acquired 3D data point cloud.

According to yet another aspect of the invention, there is provided a geometrical modeling unit comprising a CRD module, which enables retrieving acquired two-dimensional (2D) data and three-dimensional (3D) data including a point cloud and additional data of at least one part of a predefined space including at least one three-dimensional physical surface, wherein said space part is referred to as a measuring space, wherein the 2D data is acquired from at least one 2D sensor and the 3D data is acquired from at least one 3D scanning system, where the geometrical modeling unit enables generating, a combined reconstructed data (CRD), which is a 3D geometrical model of the measuring space that was scanned, the CRD is created by combining the acquired 2D data with the acquired 3D data, by reconstructing additional 3D points creating a model of the measuring space, from the combined 3D and 2D data, and where the generated CRD model includes a point cloud including a substantially higher density of points than that of the corresponding acquired 3D data point cloud.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

DETAILED DESCRIPTION

Figure 1:
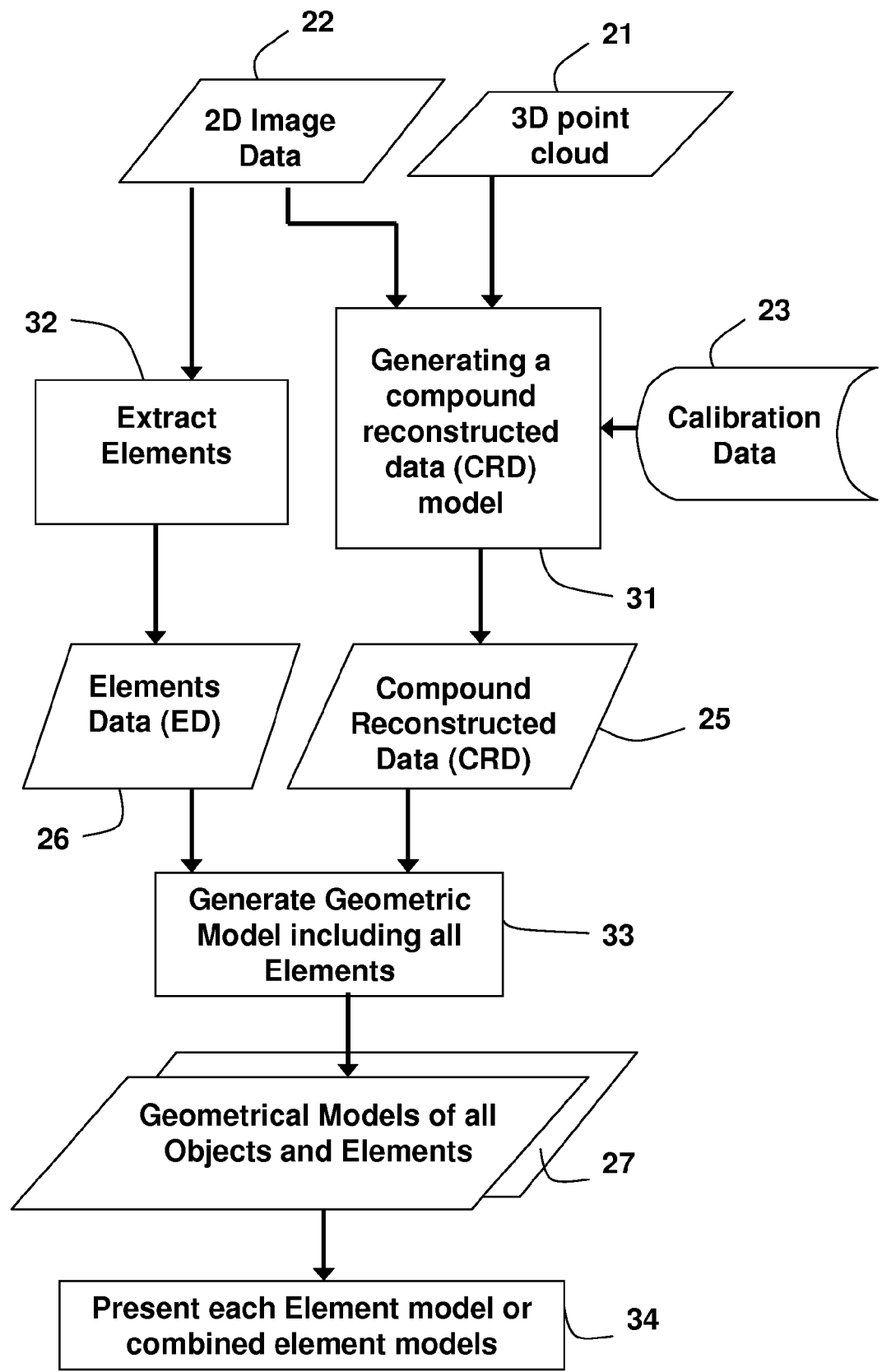
FIG. 1 is a flowchart, schematically illustrating a method for modeling three-dimensional surfaces by combining 2D and 3D data produced by 2D and 3D data acquisition means, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner:

The term "three dimensional (3D) measurement" as used herein in this application, is defined as a spatial location of a point which may be measured in any frame of reference and any coordinate system—e.g., Cartesian, spherical, cylindrical, parabolic, or ellipsoid.

The term "3D point cloud" as used herein in this application, is defined as a set of 3D measurements.

The term "scanning" as used herein in this application, is defined as a using any technology that enables to obtain a 3D model of objects in space, thereby generating a point cloud in 3D that represents the objects.

The term "interpolation" as used herein in this application, is defined as an application of a decision function to construct a function which closely fits a set of points and deduce thereby additional 3D points. The decision function may comprise a soft decision function that allows for a range of values for each measured 3D point, the range indicating a certainty level of the 3D point.

Figure 7:
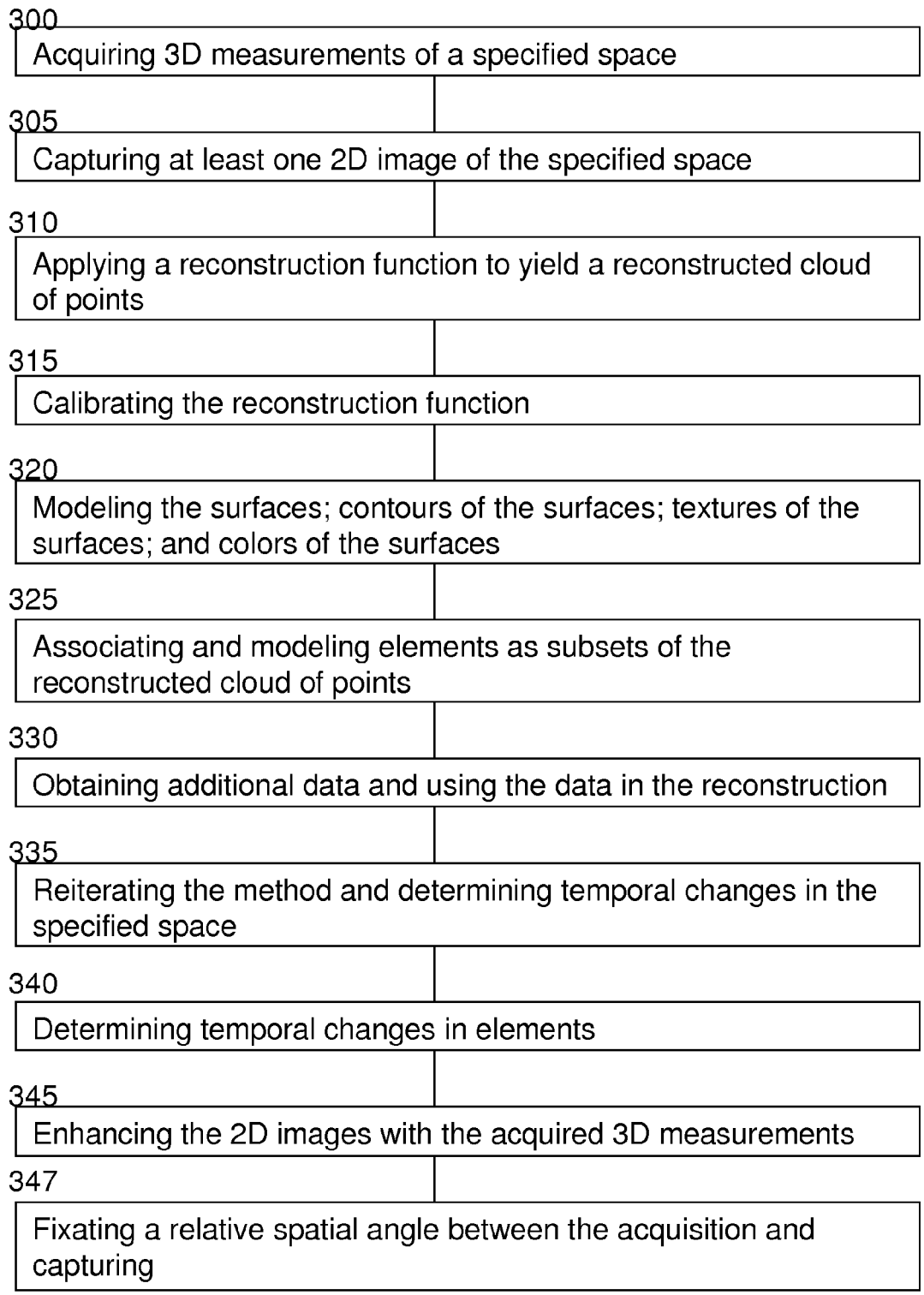
FIG. 7 is a high level schematic flowchart of a method, according to some embodiments of the invention.

FIG. 7 is a high level schematic flowchart of a method, according to some embodiments of the invention. The method comprises the following stages: acquiring 3D measurements of a specified space (stage 300) that contains physical objects, to yield at least one measured cloud of points, each point representing a specified location on a respective surface defining a respective object, wherein the measured cloud of points exhibits a first level of resolution; capturing at least one 2D image of the specified space (stage 305), wherein the image comprises an array of pixels exhibiting a second level of resolution, wherein each pixel is associated with at least one physical parameter of a respective surface of a respective object; and applying a reconstruction function (stage 310) to the at least one 2D image and the at least one 3D measured cloud of points to yield a reconstructed cloud of points representing the surfaces of the objects, wherein the reconstructed cloud of points exhibits a third level of resolution. The second level of resolution is significantly greater than the first level of resolution, the third level of resolution is greater than the first level of resolution. At least one of stages 300-310 is in operative association with at least one processor.

The method may further comprise calibrating the reconstruction function (stage 315) according to a relation between the 3D measurements of the specified space and the captured at least one 2D image.

The method may further comprise modeling, using the reconstructed cloud of points, at least one of: the surfaces; contours of the surfaces; textures of the surfaces; and colors of the surfaces (stage 320).

The method may further comprise associating elements with subsets of the reconstructed cloud of points; and modeling the elements (stage 325).

The method may further comprise obtaining additional data and incorporating the additional data in the applying the reconstruction function (stage 330).

The at least one 2D image may comprise a plurality of 2D images captured in different angles in respect to the specified space.

The method may further comprise repeating the method at specified periods and comparing the reconstructed cloud of points relating to different specified periods such as to determine temporal changes in the specified space (stage 335).

The method may further comprise associating elements with subsets of the reconstructed cloud of points; and following the temporal changes of the elements (stage 340).

The method may further comprise enhancing the captured at least one 2D image with the acquired 3D measurements (stage 345).

Acquiring the 3D measurements (stage 300) and capturing the 2D images (stage 305) may be carried out with a fixed relative spatial angle. The method may further comprise fixating the relative spatial angle while changing acquisition angles and capturing angles (stage 347).

Figure 8:
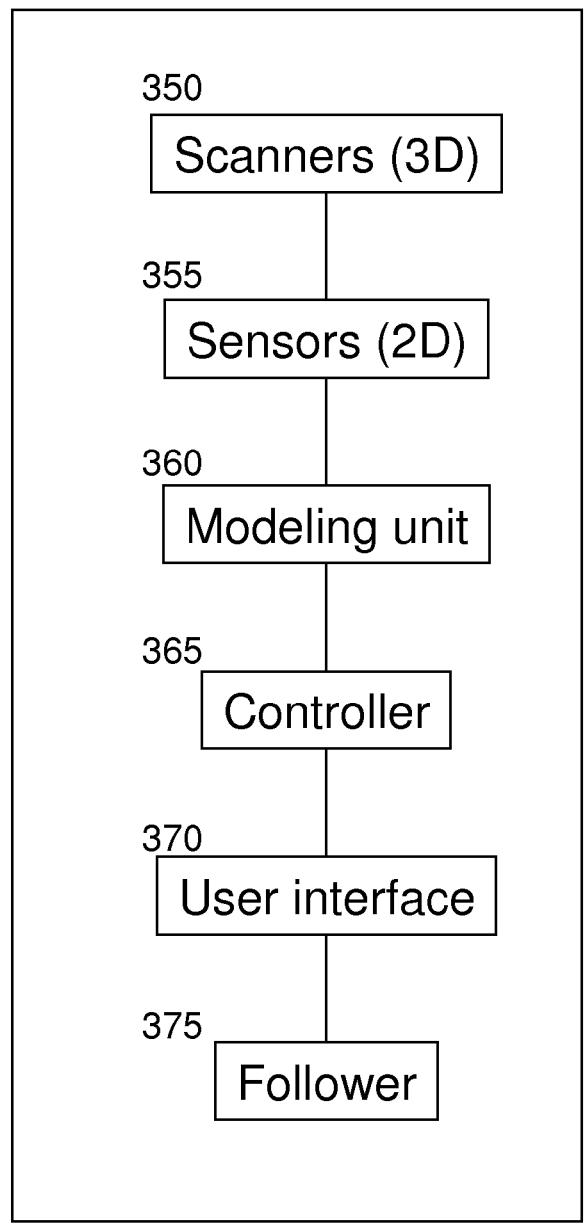
FIG. 8 is a high level schematic block diagram of a data processing system, according to some embodiments of the invention.

FIG. 8 is a high level schematic block diagram of a data processing system, according to some embodiments of the invention. The data processing system comprises at least one scanner 350 arranged to acquire 3D measurements of a specified space that contains physical objects, to yield at least one measured cloud of points, each point representing a specified location on a respective surface defining a respective object, wherein the measured cloud of points exhibits a first level of resolution; at least one sensor 355 arranged to capture at least one 2D image of the specified space, wherein the image comprises an array of pixels exhibiting a second level of resolution, wherein each pixel is associated with at least one physical parameter of a respective surface of a respective object; and a modeling unit 360 arranged to receive the acquired 3D measurements from scanner 350 and the captured 2D images from sensor 355, and to apply a reconstruction function to the at least one 2D image and the at least one 3D measured cloud of points to yield a reconstructed cloud of points representing the surfaces of the objects, wherein the reconstructed cloud of points exhibits a third level of resolution, wherein the second level of resolution is significantly greater than the first level of resolution, the third level of resolution is greater than the first level of resolution.

Scanner 350 and sensors 355 may be positioned with a fixed relative spatial angle. The data processing system may further comprise a controller 365 arranged to determine relative positioning of scanner 350 and sensor 355. Controller 365 may be further arranged to change acquisition angles of scanner 350 and capturing angles of sensors 355, while fixating a relative spatial angle between scanner 350 and sensors 355.

The data processing system may further comprise a user interface 370 arranged to allow a user to determine relative positioning of scanner 350 and sensor 355. User interface may be further arranged to obtain data from a user, and modeling unit 360 may be further arranged to enhance the reconstructed cloud of points using the data.

Modeling unit 360 may be further arranged to model, using the reconstructed cloud of points, at least one of: the surfaces; contours of the surfaces; textures of the surfaces; colors of the surfaces; and elements associated with subsets of the reconstructed cloud of points.

Sensors 355 may comprise at least one of: a thermal sensor; an optical sensor; an acoustic sensor; a vibration sensor; an electromagnetic sensor; an RF sensor; a microwave sensor.

Scanners 350 comprises at least one of: a thermal scanner; an optical scanner; an acoustic scanner; a vibration scanner; an electromagnetic scanner; an RF scanner; a microwave scanner.

Scanners 350 may be further arranged to repeatedly acquire 3D measurements of the specified space, sensors 355 may be further arranged to repeatedly capture 2D images of the specified space, and modeling unit 360 may be further arranged to repeatedly yield reconstructed clouds of points at specified periods, and to compare the reconstructed cloud of points relating to different specified periods such as to determine temporal changes in the specified space.

The data processing system may further comprise a follower 375 arranged to associate elements with subsets of the reconstructed cloud of points; and to follow the temporal changes of the elements.

Modeling unit 360 may be further arranged to enhance the 2D images with the acquired 3D measurements, and/or to enhance the 2D images using the reconstructed cloud of points.

Sensors 355 may apply any imaging technology (e.g., thermal, RF, microwave, optical, acoustic, etc.) and scanners 350 may use any technology to generate the 3D mapping.

Modeling unit 360 may use 3D data to enhance 2D data and vice versa, as well as enhance 3D data from different scanners 350 and enhance 2D data from different sensors 355.

The remainder of the description is an non-limiting exemplary embodiment of the invention.

The present invention, according to some embodiments thereof, provides a system and a method for modeling at least one part of a predefined space including at least one three-dimensional physical surface, wherein the space part is referred to hereinafter as a "measuring space".

According to some embodiments of the invention, the system and method may use a scanning system enabling to acquire 3D data of the measuring space (e.g. at least one laser scanner enabling to produce point cloud with each scanning session) and at least one 2D sensor (e.g. a camera, a detector, etc.) enabling to acquire 2D data of the measuring space.

The 2D sensor and the 3D scanning system may be positioned in relation to one another, which is known at any given moment while acquiring the 3D and the 2D data (e.g. a known angular aperture that can be set and defined by a user between the focal direction of the scanner and the focal direction of the 2D sensor (e.g. camera). Further more the calibration date may provide the relative position relations between any measured point cloud by the 3D scanner to any pixel in the 2D sensor.

The system and method may enable generating a combined compound reconstructed data (CRD), which is a 3D geometrical model of the measuring space, by combining the acquired 2D data with the acquired 3D data, by reconstructing additional 3D points (e.g. using interpolation), from the combined 3D and 2D data thereby generating the CRD model.

Reference is now made to FIG. 1, which is a flowchart, schematically illustrating a method for combining acquired 2D and 3D data for generating geometrical model(s), of the measuring space from which the 3D and 2D data are acquired.

According to these embodiments, the method may comprise:

acquiring 3D data 21 of the measuring space (e.g. using a scanning system which includes at least one laser scanner for producing a point cloud);

acquiring 2D data 22 of the measuring space (e.g. using at least one 2D sensor such as a camera);

providing calibration data 23, which relates to the relation between the 2D imaging device and the 3D scanning system;

generating 31 combined compound reconstructed data (CRD) 25, by combining the acquired 2D data 22 with the acquired 3D data 21 in respect to the calibration data 23, using an interpolation enabling to reconstruct 3D points creating a CRD model of the measuring space, from the combined 3D and 2D data 21 and 22 respectively;

extracting 32 elements data (ED) 26 out of each 2D data 22 acquired (e.g. by at least one 2D sensor);

generating a geometrical model 27 of the measuring space and an element model of each extracted element 33, by combining the CRD 25 of each measuring space that is scanned with the extracted ED 26; and enabling to present 34 each element model separately (e.g. in contour lines representation and/or in point cloud representation) according to its positioning in the measuring space 200 and/or to present the combined representation of all or some of the element models according to their positioning in the measured space (e.g. presenting the elements' relative positioning to one another according to their measured positioning in the measured space)

According to embodiments, the acquired 3D data may include a point cloud of the measuring space, where each point in the point cloud is represented by three coordinates' values: x,y,z. The 2D data may include an image having acquired points in two dimensions where each point is represented by a two-dimensional coordinates values x',y'. The interpolation may enable producing points of higher resolution that the resolution of the initial point cloud. The points produced by the interpolation process having three coordinates' values of each point x'',y'',x'' may be calculated according to a predefined interpolation function or mathematical operator, enabling to transform each point x',y' of the 2D data into a three-dimensional point x,y,z and thereby improving the resolution of the original 3D point cloud by adding more points to the cloud.

For example, if each scanning of the measuring space produces an "N" number of 3d points and the 2D image acquisition produces "M" number of 2d points, the total number of points "P" in the new CRD cloud model may be substantially: N<P<=M.

According to some embodiments, wherein acquiring of the 2D data may produce a 2D image of higher resolution that the resolution of the acquired 3D data (e.g. M>>N) thereby the additional calculated 3D points, added to the original point cloud may be extremely efficient for getting high resolution and high quality CRD 25 model out of a low-resolution point cloud (e.g. achieving high-resolution modeling using cheap scanners of low-resolutions).

According to some embodiments, the ED may include one or more features of the identified elements of each measuring space such as the contour lines of each element, the texture mapping of each element, the color mapping of each element and the like, enabling to generate an element model for each element according, for example, to the identified contour lines.

The elements may be defined by contour lines; a list of structures indicators, dimensions and positions (e.g. a cylinder of defined dimensions attached at the upper baser to a sphere of defined dimensions, etc.); objects and the like that can be identified from the 2D data 22 (e.g. image) at each acquisition session through image analysis of the 2D data 22.

The contour lines, the color and/or texture of each element may be identified by image analysis of the acquired 2D data.

The data (2D and/or 3D) acquisition may be carried out in real time and substantially simultaneously at the 2D sensor and the 3D scanner or alternatively, at different times.

The data processing may be carried out offline at a remote processing unit.

Figure 2:
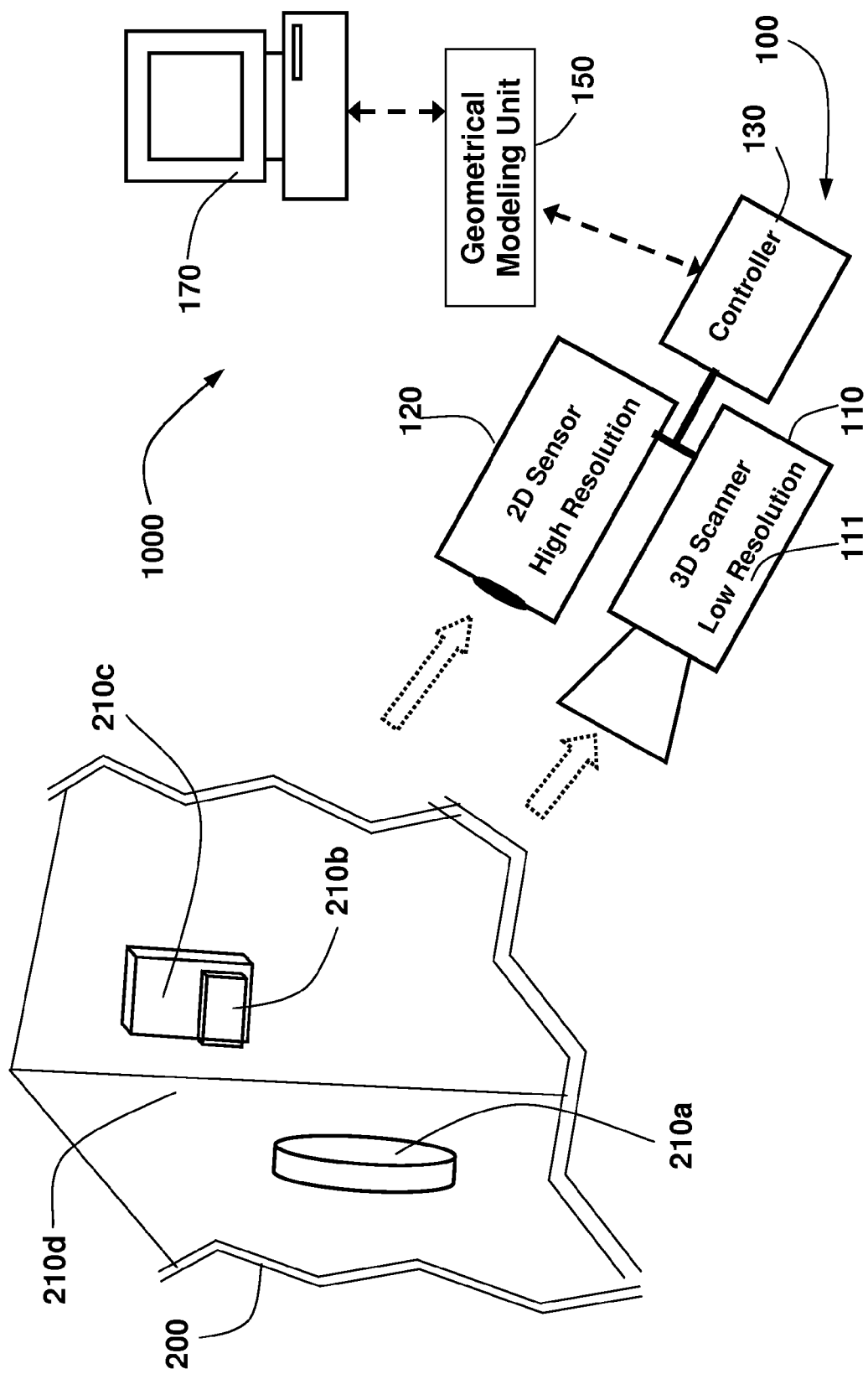
FIG. 2 is a block diagram, schematically illustrating a system for modeling three-dimensional surfaces by combining 2D and 3D data produced by 2D and 3D data acquisition means, according to some embodiments of the invention.

Reference is now made to FIG. 2, which is a block diagram, schematically illustrating a system 100 for modeling a measuring space 200 comprising various elements 210a, 210b, 210c and 210d.

As illustrated in FIG. 2, an element 210 may be any physical surface that can be distinguished from another physical surface such as a corner of a room 210d, a rectangular object 210c including another element 210b therein or thereupon etc.

According to embodiments illustrated in FIG. 2, the system 1000 may comprise:

an acquisition system 100 comprising:

a scanning system 110 comprising at least one scanner 111 for acquiring 3D data 21 of the measured space 200; and at least one 2D sensor 120, operatively associated with the scanning system 110, enabling to acquire 2D data 22 of the scanned measured space 200; and a controller 130 enabling a user to adjust the positioning relation between the 2D sensor 120 and the scanning system 110, and customize operative features of each 2D sensor 120 and scanner 111 of the acquisition system 100;
and a geometrical modeling unit 150, which enables retrieving acquired 2D and 3D data 22 and 21 and additional data (e.g. ration data 23 or any other additional data) from the acquisition system 100 and analyze the received data to generate, a combined reconstructed data (CRD) model, which is a 3D geometrical model of the measuring space 200 that was scanned and other enhanced models relying upon the CRD and other additional data.

The CRD may be generated by combining the acquired 2D data 22 with the acquired 3D data 21, using an interpolation enabling to reconstruct 3D points creating a CRD model of the measuring space 200, from the combined 3D and 2D data.

The scanner 111 may be a low-resolution scanner producing a point cloud at each scanning session, compared to the acquisition resolution of the 2D sensor 120, where the generating of a CRD may improve the resolution of the generated CRD, which be an improved point cloud of higher resolution than that of the original point cloud of the acquired 3D data 21. The 2D sensor 120 may produce, 2D image data 22 of high-resolution, compared to the resolution of the 3D data 21 produced by the scanner 111.

The scanner 111 may be a 3D scanner, producing a point cloud or any other scanner producing 3D data of scanned physical surfaces such as an RF scanner, photometric systems (using multiple 2d cameras to produce 3D images), passive scanners enabling to detect radiation emitted from an external source, or any other scanner or system producing 3D data of 3D physical surfaces known and/or to be known in the art.

The 2D sensor may be any device enabling to acquire 2D data (e.g. images) such as a camera, a CCD, a video camera, and/or any other device known and/or to be known in the are enabling acquiring 2D data.

The geometrical modeling unit 150 may be a software, a hardware or a combined module, which may be embedded and ran by at least one computerized system 170 associated with the acquisition system 100 or embedded in the controller 130 of the acquisition system 100 or anywhere else that enables the geometrical modeling unit 150 to enable processing the data retrieved or received from the acquisition system 100 and produce models of either CRD, improved elements models etc.

Additionally or alternatively, the produced models (either CRD or other data) may be transmitted from the geometrical modeling unit 150 to any designated computerized system for storing, further processing etc. such as for other modeling software tools such as CAD (computer aided design).

Figure 3:
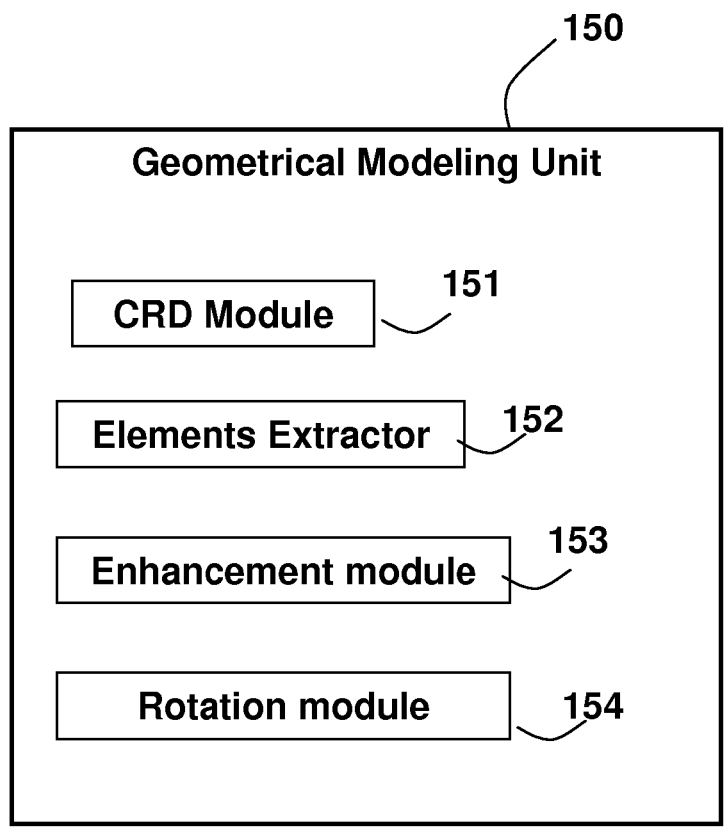
FIG. 3 is a block diagram, schematically illustrating a geometrical modeling unit enabling to process and combine 2D and 3D data for creating geometrical models of 3D surfaces, according to some embodiments of the invention.

Reference is now made to FIG. 3, which schematically illustrates the geometrical modeling unit 150, according to some embodiments of the invention. According to these embodiments, the geometric modeling unit 150 may comprise: a CRD module 151, which enables retrieving acquired 2D data 22 and 3D data 21 and additional data of the measuring space 200 and generating, CRD, which is a 3D geometrical model of the measuring space 200 that was scanned in each scanning session; an elements module 152, which enables extracting elements data (ED) 26 out of each acquired 2D data 22 of the measuring space 200; and generating a geometrical model of the measuring space 200 and of each extracted element in the measuring space 200, by combining the CRD with each extracted ED of the measuring space; an enhancement module 153 enabling to enhance each geometrical model (either a CRD model 25 or an element model 27) by receiving additional data and executing additional calculations for creating the enhanced geometrical model (e.g. by adding coloring, texture, other acquisition data to enhance the model); and a rotation module 154, enabling to generate a mathematical operator enabling to rotate and/or linearly shift the models, by analyzing multiple CRD models and elements data acquired at different views of the same measuring space 200, where the rotation module 154 further enables identifying common elements shared by both CRD views by analyzing of the elements; calculating and generating a transformation operator (e.g. a mathematical matrix operator), using the identified coordinates of the elements identified, where the transformation operator enables broadening the CRD model view according to the rotation and/or shifting views provided by identifying the overlapping areas between the at least two CRD received; and calculating rotation and/or shifting transformation of the model of each element in the measuring space 200, using the transformation operator, thereby producing a broad view (e.g. a panoramic view) of the measuring space 200.

Figure 4:
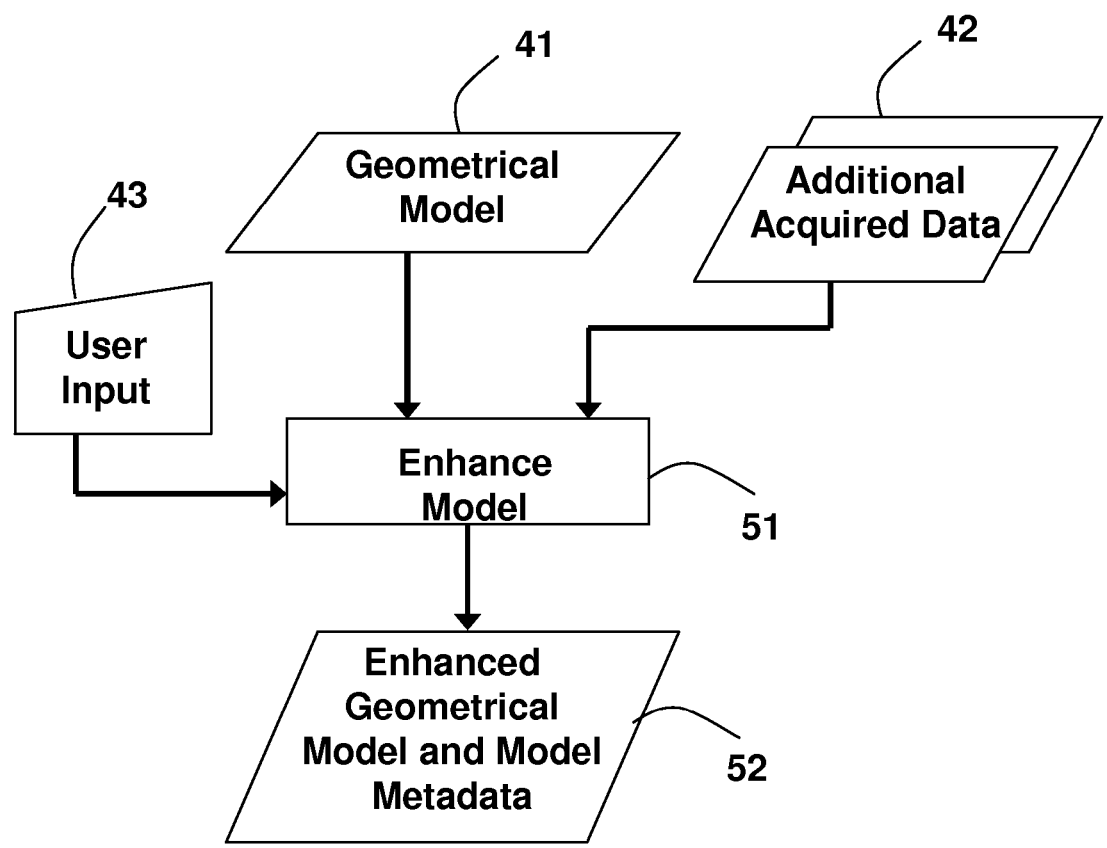
FIG. 4 is a flowchart, schematically illustrating a process for enhancing a geometrical model, according to some embodiments of the invention.

Reference is now made to FIG. 4, which is a flowchart schematically illustrating a process for enhancing a CRD and/or element model 25/27 received at 41, according to some embodiments of the invention. According to these embodiments, the enhancement module 153 may receive additional data either user input data 43 inputted by one or more users and/or additional acquired data 42 acquired by other external device enabling to acquire image data of the measuring space 200 such as a thermal sensor (producing thermal 2D image of the space 200); seismic sensor (producing a seismic 2D image of the space 200) or any other acquisition device and technique known in the art. The model may enhanced 51 by combining the model data (e.g. the improved point cloud of the CRD 25) with the additional data and/or by first analyzing the additional data (e.g. using image analysis, for example, for identifying the contour lines of the elements or defining elements as hot or cold bodies identified in the thermal image produced by the thermal sensor). The resulting model may be an enhanced model 52 including more information regarding the originally inputted CRD or elements model.

According to some embodiments of the invention, the additional data may be received from one or more additional imaging devices, which may include, for example a millimetric-waves scanner (such as an RF scanner enabling to identify objects using RF or any other millimetric-waves technology), wherein the enhancement of the geometrical model may include mapping of objects in the scanned space according to the positioning of the object by adding 3D points to the points cloud, wherein the mapping enables using the millimetric-waves scanner to identify and further scan the objects and to identify and scan objects that are hidden by other objects in said scanned space (for example, objects that are hidden behind a wall or inside another object).

Figure 5:
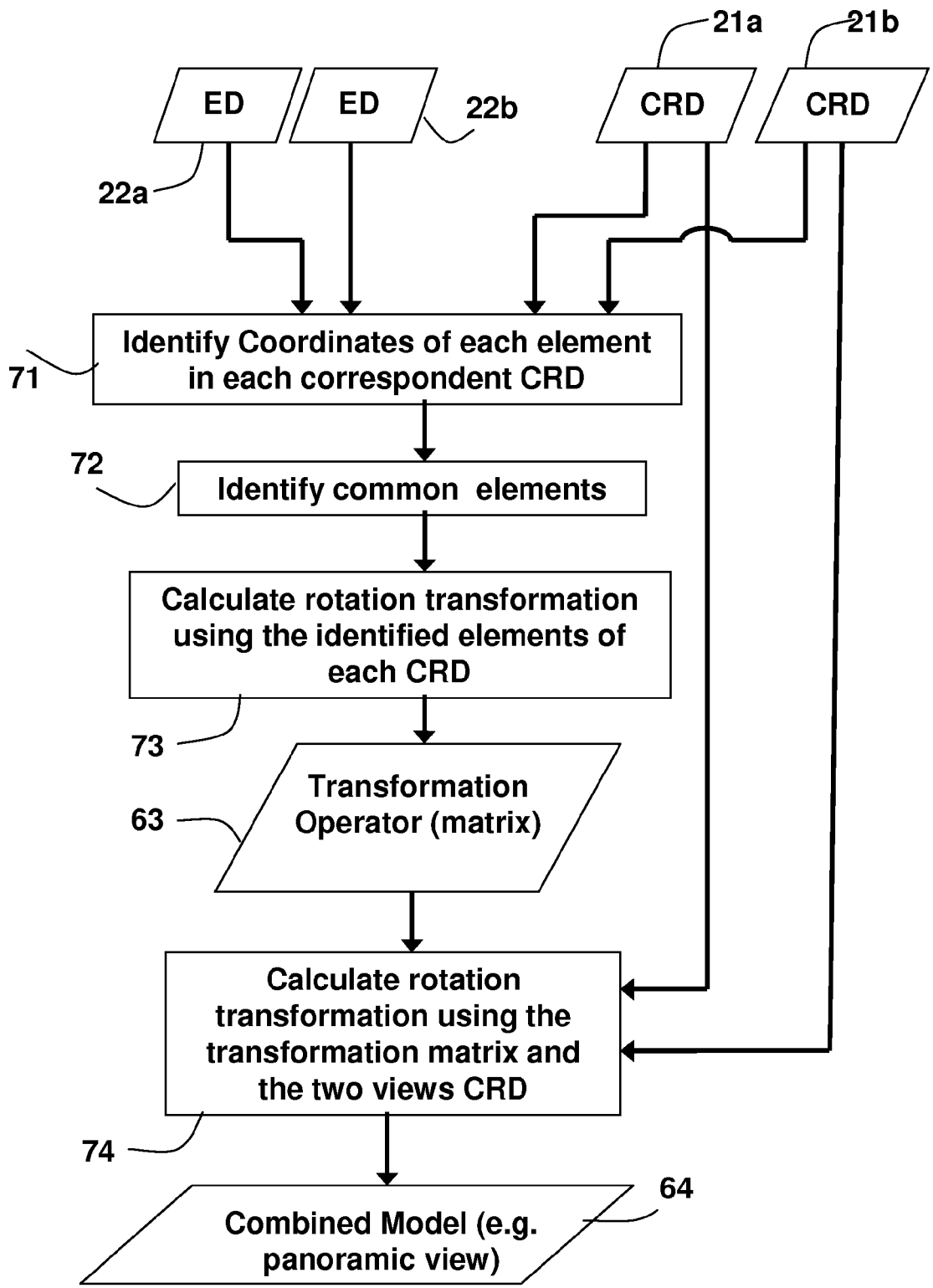
FIG. 5 is a flowchart, schematically illustrating a process for modeling three-dimensional surfaces by combining 2D and 3D data of multiple acquisition views produced by multiple data acquisition means, according to some embodiments of the invention.

Reference is now made to FIG. 5, which is a flowchart, schematically illustrating a process for generating the transformation operator and using the operator for rotating and shifting of generated models.

The process may comprise:

receiving at least two CRD 21*a* and 21*b* associated with different acquisition views of the measuring space 200;

receiving at least two ED 22*a* and 22*b* corresponding to the views of the received CRD 200;

identifying coordinates of each element model in each CRD using its corresponding ED 71;

identifying common elements 72 shared by both CRD views;

calculating and generating a transformation operator 73 (e.g. a mathematical matrix operator), using the identified coordinates of the elements identified, where the transformation operator 63 enables broadening the CRD model view according to the rotation views provided by identifying the overlapping areas between the at least two CRD received; and calculating rotation transformation 74 of the model of each element in the measuring space 200, using the rotation transformation operator 63, thereby producing a combined model 64 comprising data of multiple views of elements including a broader view of the measuring space 200 (e.g. a panoramic view).

Figure 6:
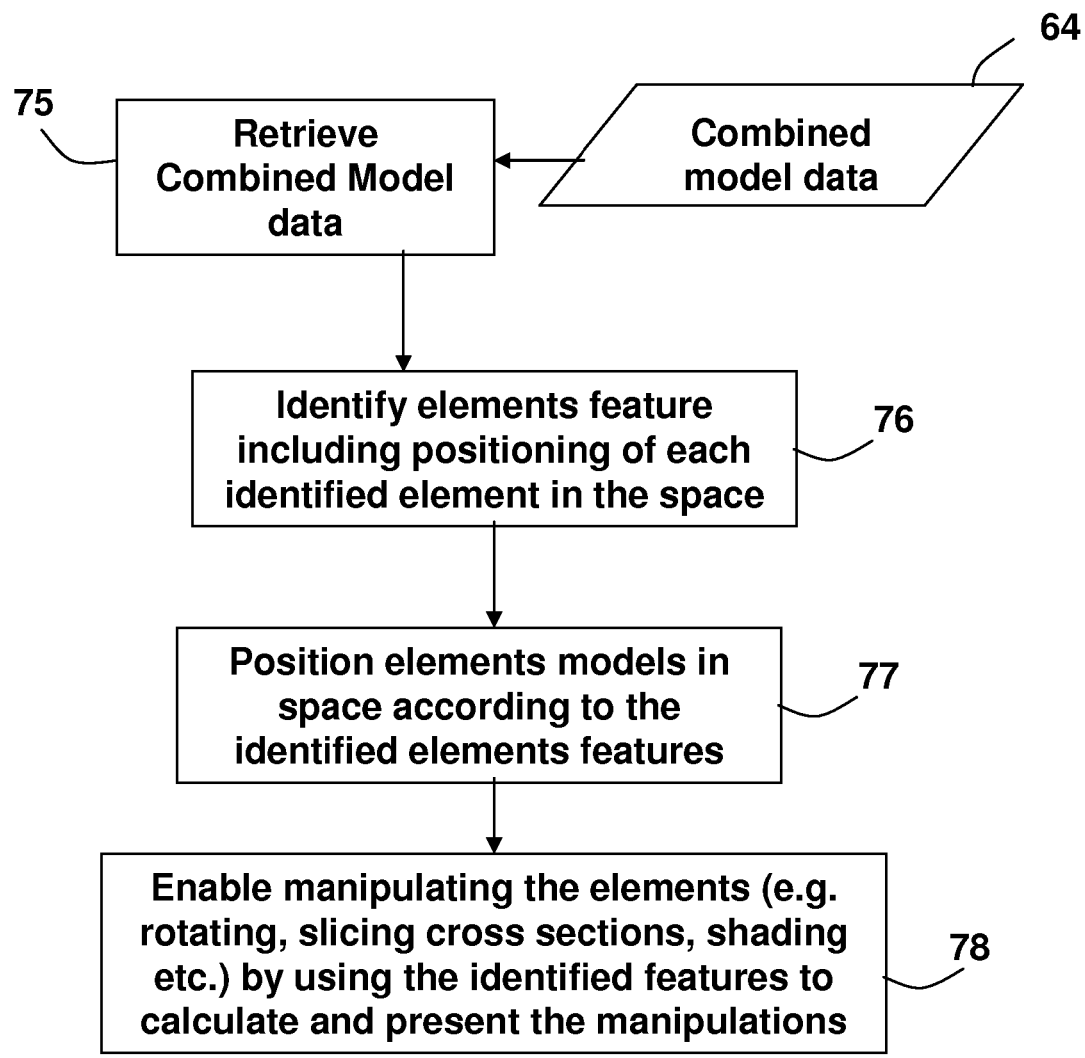
FIG. 6 is a flowchart schematically illustrating a process of using and presenting 3D models comprising combined views of elements data, according to some embodiments of the invention.

Reference is now made to FIG. 6, which is a flowchart schematically illustrating a process of using and presenting the combined models 64 comprising combined views of elements data, according to some embodiments of the invention.

According to the process presented in FIG. 6, the process may comprise:

retrieving a combined model data 64 comprising multiple views of each element and other features relating to each element (such as color, texture, shadings, cross sectional views etc.) 75 e.g. by using a software for presenting and manipulating 3D models (such as CAD);

identifying features (such as coordinates, scaling, surfaces, color, texture, shadings, cross sectional views etc.) of each element in the combined model 76;

positioning each element in the virtual space according to at least some of the identified features (e.g. coordinates and scales, surfaces functions etc.) 77; and presenting the elements' 3D models in the virtual space according to the identified features 78.

Another separate graphical tool (e.g. CAD) may be used for carrying out the process of presenting and manipulating (e.g. rotating viewing cross sections, changing textures and colors, etc.) each element of the combined model. The multiple views may be used by the separate graphical tool to enable rotating each element model in various rotation positions.

According to some embodiments of the invention, two 2D sensors 120 (e.g. two high-resolution cameras) may be used and installed in the system 1000 to enhance the distance of measurement from which 3D surfaces can be measured. Since commonly used low-resolution scanners 110 usually enabling measuring maximal distances of around 7.5 meters, which is often too low, using two 2D sensors may enable enlarging the maximal measuring distance by using the 2D data information received from both 2D sensors 120 to measure distances from the acquisition system 100 to the surfaces measured thereby.

The two 2D sensors 120 measure the surface(s) from two points of view at each given moment, enabling to produce two sets of 2D data. The two sets of acquired 2D data of two points of view may then be processed to construct a 3D model, as known in the art.

The positioning relation between the two sensors 120 and between each of the 2D sensors 120 and the scanner 110 may be known and may also be adjustable.

The processing of the two data sets to construct a 3D model may take into account in the calculations the positioning relation between the two sensors 120.

The distance or maximal distance between the measured point on the physical surface and the sensors 120 may be calibrated, in real time, and may be required for each single measurement. To calibrate the two sensors 120, each 2D data image from a first sensor 120 may be calibrated against the 2D data image of a second sensor 120, where the positioning relation between the first and the second sensor 120 are known. The system 1000 may enable extracting 2D Element data (ED) from each sensor 120 and associate each identified element of one sensor 120 to an identified element of the other sensor 120. At least some of the xy points (pixels) measured by each 2D sensor 120 may be calibrated according to 3D points x'y'z' from the scanner 110. Each measured pixel in the 2D data of each 2D sensor 120 may be mathematically associated with a direction vector deduced by using the 3D data of the scanner 110 and/or by using the two points of view of the two 2D sensors 120. The 2D data and the direction vector may enable calculating an interpolated new 3D point thereby enhancing the point cloud. In this way, once the 2D data has calibrated in accordance with the 3D data in an initial measurement, the measuring session may begin without having to recalibrate in each measuring point.

According to some embodiments of the invention, the system may further enable analyzing and calculating changes in the geometric model in time, wherein an additional scanning system (e.g. a scanner that can move inside the measuring space; or a static scanner that measures the changes in the space over time) can receive the already identified and calculated geometric model and only measure or search for changes in the model. This may allow a near real time system that allows scanning the space by requiring a low-resolution additional 3D scanner for measuring the changes in the space over time since the model data is already known in the system.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination.

Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of geometrical modeling comprising:
acquiring from a scene 3D data to provide an acquired point-cloud having N points in a 3D coordinate system:
acquiring from said scene a 2D image defined over a two-dimensional array of M pixels; and
based on both said 2D image and said acquired point-cloud, using a processor to create additional points in said 3D coordinate system by associating pixels in said 2D array with direction vectors deduced using said 3D data, and generating a three-dimensional model of said scene using said additional points in said 3D coordinate system, said three-dimensional model being defined over a reconstructed point-cloud having P points at a higher density than that of said acquired point-cloud, wherein said P, said N and said M satisfy the relation $N<P\leq M$.

2. The method of claim 1, wherein said generating said model, comprises reconstructing a point into said reconstructed point-cloud for each of at least a portion of said pixels in said array.

3. The method of claim 1, further comprising calibrating said array according to said acquired point-cloud prior to said generation of said model.

4. The method of claim 1, further comprising acquiring an additional 2D image from a different view angle, wherein said generating said model comprises associating each of at least a portion of said pixels in said array with a direction vector deduced using said 2D image and said additional 2D image.

5. The method of claim 1, further comprising modeling, based on said reconstructed point-cloud, at least one of: surface in said scene, contours of surfaces in said scene, textures of surfaces in said scene, and colors of surfaces in said scene.

6. The method of claim 1, further comprising associating elements with subsets of said reconstructed point-cloud, and modeling said elements.

7. The method of claim 1, further comprising repeating said acquisitions and said generating said three-dimensional model at least once so as to determine changes in the said scene.

8. The method of claim 7, further comprising associating elements with subsets of said reconstructed point-cloud, and modeling said elements.

9. The method of claim 8, further comprising determining changes in said elements based on said changes in the said scene.

10. The method of claim 1, further comprising obtaining additional data and using said additional data for reconstructing into said reconstructed point-cloud additional points corresponding to positioning of the object that are hidden by other objects in said scene.

11. The method of claim 1, further comprising enhancing said 2D image using said reconstructed point-cloud.

12. The method of claim 1, wherein said acquisitions are carried out with a fixed relative angle.

13. The method of claim 12, further comprising fixating said fixed relative angle while changing acquisition angles.

14. A system for geometrical modeling comprising:
a scanning system configured for acquiring from a scene 3D data to provide an acquired point-cloud having N points in a 3D coordinates system;
a 2D sensor configured for acquiring from said scene a 2D image defined over a two-dimensional array of M pixels; and
a data processing system, configured for creating, based on both said 2D image and said acquired point-cloud, creating additional points in said 3D coordinate system by associating pixels in said 2D array with direction vectors deduced using said 3D data, and generating a three-dimensional model of said scene using said additional points in said 3D coordinate system, said three-dimensional model being defined over a reconstructed point-cloud having P points at a higher density than that of said acquired point-cloud, wherein said P, said N and said M satisfy the relation $N<P\leq M$.

15. The system of claim 14, wherein said data processing system is configured for reconstructing a point into said reconstructed point-cloud for each of at least a portion of said pixels in said array.

16. The system of claim 14, wherein said data processing system is configured for associating elements with subsets of said reconstructed point-cloud, and modeling said elements.

17. The system of claim 14, wherein said data processing system further is configured for receiving additional data and using said additional data for reconstructing into said reconstructed point-cloud additional points corresponding to positioning of the object that are hidden by other objects in said scene.

18. The system of claim 14, wherein said data processing system is configured for enhancing said 2D image using said reconstructed point-cloud.

19. The system of claim 14, wherein said scanning system and said 2D sensor are positioned in a fixed relative angle.

20. The system of claim 19, further comprising a controller configured for determining a relative positioning of said scanning system and said 2D sensor.

21. The system of claim 20, wherein said controller is configured for changing acquisition angles of said scanning system and said 2D sensor, while fixating said relative angle therebetween.

22. A computer software product, comprising a non-transitory computer-readable medium in which program instructions are stored, which instructions, when read by a computer, cause the computer to receive an acquired point-cloud representing 3D data acquired from a scene and a 2D image of said scene, wherein said point-cloud has N points in a 3D coordinate system and said 2D image is defined over a two-dimensional array of M pixels; to create, based on both said 2D image and said acquired point-cloud, additional points in said 3D coordinate system by associating pixels in said 2D array with direction vectors deduced using said 3D data; and to generate a three-dimensional model of said scene using said additional points in said 3D coordinate system, said three-dimensional model being defined over a reconstructed point-cloud having P points at a higher density of points than that of said acquired point-cloud, wherein said P, said N and said M satisfy the relation $N<P\leq M$.

23. The method of claim 9, wherein said additional data is received from at least one of: a thermal sensor, a seismic sensor, a millimetric-waves scanner.

24. The method of claim 17, wherein said additional data is received from at least one of: a thermal sensor, a seismic sensor, a millimetric-waves scanner.

25. The method of claim 1, wherein said acquiring said 3D data is by a 3D scanner, wherein said acquiring said 2D image is by a 2D sensor, and wherein said 3D scanner has a lower resolution compared to said 2D sensor.

26. The method of claim 25, wherein said 3D scanner is selected from the group consisting of an RF scanner, a multiple 2D cameras, and a laser scanner.

* * * * *